US012397629B2

(12) United States Patent
Piele et al.

(10) Patent No.: US 12,397,629 B2
(45) Date of Patent: Aug. 26, 2025

(54) WHEEL HUB, AUXILIARY DRIVEN VEHICLE WITH THE WHEEL HUB AND CLIP ARRANGEMENT

(71) Applicant: Porsche eBike Performance GmbH, Ottobrunn (DE)

(72) Inventors: Theodor Piele, Gauting (DE); Herbert Sammüller, Unterföhring (DE)

(73) Assignee: Porsche eBike Performance GmbH, Ottobrunn (DE)

( * ) Notice: Subject to any disclaimer, the term of this patent is extended or adjusted under 35 U.S.C. 154(b) by 865 days.

(21) Appl. No.: 17/616,878

(22) PCT Filed: May 28, 2020

(86) PCT No.: PCT/EP2020/064829
§ 371 (c)(1),
(2) Date: Dec. 6, 2021

(87) PCT Pub. No.: WO2020/245026
PCT Pub. Date: Dec. 10, 2020

(65) Prior Publication Data
US 2022/0258531 A1 Aug. 18, 2022

(30) Foreign Application Priority Data
Jun. 6, 2019 (DE) .................... 10 2019 115 401.4

(51) Int. Cl.
*B60K 7/00* (2006.01)
*B60B 27/00* (2006.01)
*B60B 27/02* (2006.01)
(Continued)

(52) U.S. Cl.
CPC ........ *B60K 7/0007* (2013.01); *B60B 27/0021* (2013.01); *B60B 27/0068* (2013.01);
(Continued)

(58) Field of Classification Search
CPC .......... B60K 7/0007; B60K 2007/0038; B60K 2007/0092; B60B 27/0021;
(Continued)

(56) References Cited

U.S. PATENT DOCUMENTS

| 5,490,431 A | 2/1996 | O'Mahony et al. |
| 7,045,999 B2 | 5/2006 | Ersoy et al. |

(Continued)

FOREIGN PATENT DOCUMENTS

| CN | 105473436 A | 4/2016 |
| CN | 105846596 A | 8/2016 |

(Continued)

OTHER PUBLICATIONS

DE-102010011390-A1, English Translation (Year: 2011).*
WO-2014109096-A1, English Translation (Year: 2014).*

*Primary Examiner* — Ryan D Walsh
(74) *Attorney, Agent, or Firm* — Slater Matsil, LLP

(57) ABSTRACT

A wheel hub is disclosed. In an embodiment, the wheel hub includes a wheel axle, a clip encompassing an outer surface of the wheel axle in a C-shape manner and mounted torsionally rigid against the wheel axle, a magnetic field sensor mounted on the clip and a pole ring arranged concentrically around the wheel axle in a distance to the magnetic field sensor and supported such that the pole ring is rotatable relatively to the wheel axle, wherein the magnetic field sensor is configured to detect a magnetic field originating from the pole ring so that a movement of the pole ring relative to the wheel axle is deducible.

16 Claims, 7 Drawing Sheets

(51) Int. Cl.
  *B60B 27/04*   (2006.01)
  *B62M 6/50*    (2010.01)
  *G01P 3/488*   (2006.01)
(52) U.S. Cl.
  CPC ............ *B60B 27/02* (2013.01); *B60B 27/047* (2013.01); *B62M 6/50* (2013.01); *G01P 3/488* (2013.01); *B60B 27/023* (2013.01); *B60K 2007/0038* (2013.01); *B60K 2007/0092* (2013.01); *B60Y 2200/13* (2013.01)
(58) Field of Classification Search
  CPC ... B60B 27/0068; B60B 27/02; B60B 27/047; B60B 27/023; B62M 6/50; G01P 3/488; B60Y 2200/13
  See application file for complete search history.

(56) References Cited

U.S. PATENT DOCUMENTS

| | | | |
|---|---|---|---|
| 9,063,024 | B2 | 6/2015 | Kitamura |
| 10,488,427 | B2 | 11/2019 | Koh et al. |
| 2018/0354171 | A1 | 12/2018 | Sankai et al. |
| 2019/0025337 | A1 | 1/2019 | Tsuge et al. |
| 2020/0198395 | A1 | 6/2020 | Piele |

FOREIGN PATENT DOCUMENTS

| | | | | |
|---|---|---|---|---|
| CN | 205785619 U | 12/2016 | | |
| CN | 106461698 A | 2/2017 | | |
| CN | 107238453 A | 10/2017 | | |
| CN | 207141297 U | 3/2018 | | |
| CN | 108871639 A | 11/2018 | | |
| CN | 208292453 U | 12/2018 | | |
| DE | 102010011390 A1 * | 9/2011 | ............. | B62M 6/50 |
| DE | 102010011461 A1 | 9/2011 | | |
| DE | 102012016903 A1 | 2/2013 | | |
| DE | 102013203622 A1 | 9/2014 | | |
| DE | 112016005200 T5 | 7/2018 | | |
| EP | 0682238 A1 | 11/1995 | | |
| EP | 0683093 A1 | 11/1995 | | |
| EP | 0700825 A1 | 3/1996 | | |
| EP | 1424225 A2 | 6/2004 | | |
| EP | 3258128 A1 | 12/2017 | | |
| JP | 2011143752 A | 7/2011 | | |
| KR | 20170132015 A | 12/2017 | | |
| WO | 1999030960 A2 | 6/1999 | | |
| WO | WO-2014109096 A1 * | 7/2014 | ............. | G01P 1/026 |
| WO | 2019042619 A1 | 3/2019 | | |

* cited by examiner

WHEEL HUB, AUXILIARY DRIVEN VEHICLE WITH THE WHEEL HUB AND CLIP ARRANGEMENT

This patent application is a national phase filing under section 371 of PCT/EP2020/064829, filed May 28, 2020, which claims the priority of German patent application 102019115401.4, filed Jun. 6, 2019, each of which is incorporated herein by reference in its entirety.

TECHNICAL FIELD

The invention relates to a wheel hub for a drive wheel of a vehicle, an auxiliary driven bicycle and a clip arrangement for the wheel hub.

BACKGROUND

Electrically driven vehicles are gaining more and more importance for meeting different individual mobility requirements. In particular, the electric bicycle is on the rise. The electric bicycle is a bicycle having an electric motor as an auxiliary drive. An electric drive assistance is conventionally requested by way of pedalling pedals which are fastened to the pedal cranks of the bicycle when the pedals are alternately pressed downward in a correspondingly pronounced manner. A chain ring is mounted on the pedal cranks in order to transmit a torque to the drive wheel of the bicycle, the drive wheel typically being the rear wheel, and the chain ring being coupled via a chain to a pinion which is mounted on the rear wheel in a torsionally rigid manner in the drive direction. The electric motor is conventionally accommodated in the wheel hub of the rear wheel as a hub motor, the supply of which with electric power is brought about by rechargeable battery cells.

A measurement of a movement of the electric bicycle can be provided in order to control the electric motor. The measurement of the movement can for example be a velocity of the electric bicycle, for example in order to guarantee that the electric bicycle does not exceed a maximum velocity out of security reasons. The velocity of the electric bicycle can for example be determined by determining a rotational speed of a hub. This can for example be carried out by means of a pole ring and a magnetic field sensor that are accommodated in the wheel hub. The pole ring comprises alternately in its circumferential direction magnetic north poles and magnetic south poles and the magnetic field sensor measures the magnetic field originating from the pole ring. A relative velocity between the pole ring and the magnetic field sensor can be deduced out of the magnetic field that is changing over time. It is hereby disadvantageous that the magnetic field sensor only works optimal if the magnetic field sensor is arranged in a predetermined distance range to the pole ring, wherein the distance range can be very narrow. In case the magnetic field sensor is arranged outside of the distance range, the measurement of the relative movement between the pole ring and the magnetic field sensor is only imprecise.

SUMMARY

Embodiments provide a device for a drive wheel of a vehicle, wherein a precise measurement of a movement can be performed with the device.

The wheel hub for a drive wheel of a vehicle comprises a wheel axle, a clip that encompasses an outer surface of the of the wheel axle in a C-shape manner and is mounted torsionally rigid against the wheel axle, a magnetic field sensor that is mounted on the clip, and a pole ring that is arranged concentrically around the wheel axle and in a distance to the magnetic field sensor as well as is supported such that the pole ring can rotate relatively to the wheel axle, wherein the magnetic field sensor is adapted to detect a magnetic field that originates from the pole ring, so that a movement of the pole ring relative to the wheel axle can be deduced.

The magnetic field sensor can be arranged in a defined distance to the pole ring by means of the clip. The defined distance can thereby be chosen such that it is in a distance range to the pole ring, wherein the magnetic field sensor works optimal in the distance range. By arranging the magnetic field sensor in the distance range, a device is provided with which a measurement of the movement of the pole ring relative to the wheel axle can be performed with a high precision.

The pole ring comprises alternately in its circumferential direction magnetic north poles and magnetic south poles. In principle, embodiments can be carried out with a single one of the north poles and a single one of the south poles, but wherein the precision of the measurement of the movement of the pole ring relative to the wheel axle is higher if a plurality of the north poles and the south poles is provided.

The magnetic field sensor can for example be adapted to determine a velocity of the pole ring relative to the wheel axle. It is alternatively conceivable that the magnetic field sensor is adapted to determine a direction of the movement of the pole ring relative to the wheel axle. Therefore, it can advantageously be distinguished between a forward movement and a backward movement of the drive wheel. Exemplary sensors are the sensors AK 8777B and AK 8778B of the company Asahi Kasai. In addition, the magnetic field sensor can be adapted to determine also the velocity of the pole ring relative to the wheel axle in addition to the direction of the movement of the pole ring relative to the wheel axle. This can also be accomplished by the sensors AK8777B and AK 8778B of the company Asahi Kasai.

The velocity can for example be a rotational speed and/or an angular velocity. It is also possible to calculate the rotational speed and/or the angular velocity with a diameter of the drive wheel in order to determine a vehicle velocity of a vehicle that comprises the drive wheel. The magnetic field sensor can for example be a Hall sensor. The distance can be an axial distance and/or a radial distance.

The clip can be mounted force-fittedly on the wheel axle, so that the clip is mounted torsionally rigid against the wheel axle. For this purpose, the clip can be under a mechanical stress in its mounted state. By the force-fit mounting of the clip on the wheel axle, it is not required to provide a fastening means, for example a screw or a rivet. The clip can thereby be mounted on the wheel axle by a simple imposing of the clip over the wheel axle. In addition, in the case that the magnetic field sensor works erroneously, the magnetic field sensor can simply be exchanged by exchanging the clip together with the magnetic field sensor. It is additionally conceivable, that the clip is mounted form-fittedly on the wheel axle, so that the clip is mounted torsionally rigid against the wheel axle. It is also conceivable that the clip is mounted on the wheel axle force-fittedly as well as form-fittedly.

It is preferred that the wheel hub comprises a pinion carrier on which at least one pinion can be mounted torsionally rigid or a belt pulley for driving the drive wheel, a transmission sleeve that is coupled torsionally rigid with the belt pulley or the pinion carrier as well as is supported concentrically around the wheel axle and such that it can rotate relative to the wheel axle, a hub casing and a freewheel via which the transmission sleeve is coupled with the hub casing, wherein the pole ring is mounted torsionally rigid on the transmission sleeve. A torque can thereby be transferred from belt pulley or the pinion carrier via the transmission sleeve and via the freewheel to the hub casing. Since the pole ring is mounted torsionally rigid on the transmission sleeve, the pole ring rotates always relative to the magnetic field sensor that is mounted torsionally rigid against the wheel axle when the pinion carrier or the belt pulley is driven. This is for example the case when the pinion is mounted torsionally rigid on the pinion carrier and the pinion is driven by a pedalling of a rider. On the other hand, if the rider stops to pedal, the pinion together with the pinion carrier and the transmission sleeve are standing still relative to the magnetic field sensor. In this case, by providing the freewheel, the hub casing can on the other hand further rotate against the wheel axle. The magnetic field sensor therefore measures a relative movement between the pole ring and the wheel axle always when the rider pedals and no movement between the pole ring and the wheel axle when the rider does not pedal. It is thereby for example possible, in the case that the wheel hub is provided in an electric bicycle with a motor, to immediately switch off the motor by using the measured movement between the pole ring and the wheel axle, when the rider stops to pedal. In the case that the magnetic field sensor is provided that is adapted to determine the direction of the movement of the pole ring relative to the wheel axle, the motor can also be immediately switched off, when the rider pedals backwards. The motor can be an electric motor.

It is preferred that the wheel axle is made, at least in parts, as a hollow shaft and therefore comprises a cavity as well as comprises a wheel axle through hole that extends through wheel axle from the outer surface of the wheel axle to the cavity, wherein the clip comprises a clip through hole and a region that confines the clip through hole, wherein the region engages form-fittedly in the wheel axle through hole. The clip is thereby mounted even more torsionally rigid on the wheel axle and in addition, an axial displacement of the clip is prevented. In addition, the clip through hole and the wheel axle through hole can advantageously be used to guide an electric wiring of the magnetic field sensor in the cavity.

An electric wiring of the magnetic field sensor is preferably guided through the clip through hole and through the wheel axle through hole in the cavity. The electric wiring of the magnetic field sensor can then be guided out of the wheel axle on another position of the wheel axle. The other position can for example be a front side of the wheel axle and/or the wheel axle can comprise a wheel axle recess that extends through the wheel axle from the outer surface of the wheel axle to the cavity.

It is preferred that the wheel axle comprises a flattened region on the outer surface of the wheel axle and an inner surface of the clip comprises two circular arc-shaped sections and between the two circular arc-shaped sections a straight section, wherein the two circular arc-shaped sections and the straight section are arranged next to each other in a circumferential direction of the wheel axle, wherein the straight section contacts the flattened region and the circular arc-shaped sections contact the regions of the wheel axle which are arranged adjacent to the flattened region. The clip is thereby mounted form-fittedly on the wheel axle, whereby the clip is mounted even more torsionally rigid on the wheel axle. In the case that the wheel axle through hole is provided, it is preferred that the wheel axle through hole is provided in the flattened part. A larger space is thereby available for a wiring of the magnetic field sensor, as it would be the case, if the flattened part would not be provided, wherein the wiring is guided through the wheel axle through hole. Because of the larger space, the wiring can be guided with a larger curvature radius as it would be the case without the flattened region, whereby a cable break is less likely.

It is preferred that the magnetic field sensor is arranged on an outer surface of the clip. It is thereby preferred that the clip comprises an L-shaped protrusion with two arms, wherein the protrusion protrudes from the outer surface of the clip and the wheel hub comprises a magnetic field sensor circuit board, on which the magnetic field sensor is arranged, wherein the magnetic field sensor circuit board is clamped between one of the two arms and the outer surface of the clip. The magnetic field sensor circuit board together with the magnetic field sensor are thereby mounted on the clip. The assembling of the magnetic field sensor circuit board on the clip is due to the clamping relatively simple and, for example, it is not necessary to perform gluing. It is particular preferred that the magnetic field sensor circuit board abuts on the other of the two arms. Thereby, the position of the magnetic field sensor circuit board is also defined in a circumferential direction of the wheel axle.

It is preferred, that the clip is made out of an elastic material, in particular an elastic plastic material. Since the clip can deform during imposing the clip over the wheel axle in a radial direction of the wheel axle due to its elastic material, the clip can advantageously be simply mounted on the wheel axle. In addition, the elastic material dampens vibrations that are transferred from the wheel axle on the magnetic field sensor, whereby the magnetic field sensor is subjected to few vibrations. Therefore, on one hand, the lifetime of the magnetic field sensor is long and, on the other hand, the magnetic field sensor barely changes the distance to the pole ring during the vibrations, whereby the precision during measuring the movement is high also during an occurrence of the vibrations.

The wheel hub preferably comprises a torque measuring device. Therefore, a further information besides the movement is available. For example, in the case that the wheel hub is provided in the electric bicycle with the motor, by means of the torque measuring device it is possible that the motor supports the rider with a high power, in the case that the rider rides uphill and applies a high torque, and the motor supports the rider only with a low power, in the case that the rider rides downhill and applies only a low torque.

It is preferred that the wheel hub comprises a first plug part that is mounted on the clip and the torque measuring device comprises a torque measuring circuit board with a second plug part that is mounted on the torque measuring circuit board and is in engagement with the first plug part. The clip therefore defines the position of the torque measuring circuit board via the first plug part and the second plug part. In addition, it is possible to guide an electric wiring of the magnetic field sensor and an electric wiring of the torque measuring device along a single wiring harness. As an alternative to the plug parts, the torque measuring circuit board can be fixedly connected to the clip.

It is preferred that an electric wiring of the torque measuring device is guided via the first plug part and via the second plug part. In the case that the wheel axle through hole and the clip through hole are provided, it is preferred that the electric wiring of the torque measuring device is guided through the wheel axle through hole and the clip through hole into the cavity.

It is preferred that the wheel hub comprises a pinion carrier on which at least one pinion can be mounted torsionally rigid or a belt pulley for driving the drive wheel, a transmission sleeve that is coupled with the pinion carrier or the belt pulley torsionally rigid as well as is supported concentrically around the wheel axle and such that it can rotate relative to the wheel axle, a hub casing and a freewheel, via which the transmission sleeve is coupled with the hub casing, wherein the transmission sleeve comprises a magnetically coded material which magnetic properties change under the influence of a torque acting on the transmission sleeve, and the torque measuring device comprises a sensor that is arranged on the torque measuring circuit board and is adapted to detect the changing magnetic properties. The magnetic properties change due to magnetostriction. The torque can be deduced out of the changing magnetic properties that are detected by the sensor, wherein the torque acts on the transmission sleeve and is transferred starting from the pinion carrier or the belt pulley to the hub casing. The sensor can comprise a coil or several coils.

It is preferred that the wheel hub comprises a motor that is adapted to drive the drive wheel. The motor can for example be an electric motor. It is particularly preferred that the motor is arranged inside of the hub casing of the wheel hub. In addition, it is particularly preferred that the motor is adapted to transfer a motor torque to the hub casing, wherein the motor torque is not transferred via the transmission sleeve. It is therefore advantageously achieved that only the torque applied by the rider is measured by the transmission sleeve.

The auxiliary driven vehicle comprises the wheel hub with the motor, the drive wheel and a control device that is adapted to control the motor adapted to measurement data measured by the magnetic field sensor. It is preferred that the control device is adapted to control the motor additionally adapted to measurement data measured by the torque measuring device. The auxiliary driven vehicle is in particular an electric bicycle with a storage that is adapted to store electric energy and to deliver the electric energy to the motor. The storage can for example comprise accumulator cells.

The clip arrangement for a wheel axle comprises a clip that is adapted to encompass the wheel axle in a C-shaped manner and to be mounted torsionally rigid against the wheel axle, and a magnetic field sensor that is mounted on the clip.

It is preferred that the clip comprises a clip through hole and a region that confines the clip through hole, wherein the region protrudes from an inner surface of the clip. It is particularly preferred that an electric wiring of the magnetic field sensor is guided through the clip through hole.

It is preferred that an inner surface of the clip comprises two circular arc-shaped sections and a straight section between the two circular arc-shaped sections, wherein the two circular arc-shaped sections and the straight section are arranged next to each other in a direction from a first longitudinal end of the clip to a second longitudinal end of the clip.

It is preferred that the magnetic field sensor is arranged on an outer surface of the clip. It is thereby particular preferred that the clip comprises and L-shaped protrusion with two arms, wherein the protrusion protrudes from the outer surface of the clip and the clip arrangement comprises a magnetic field circuit board on which the magnetic field sensor is arranged, wherein the magnetic field sensor circuit board is clamped between one of the two arms and the outer surface of the clip. In addition, the magnetic field sensor circuit board can abut on the other of the two arms.

It is preferred that the clamp is made out of an elastic material, in particular an elastic plastic material.

It is preferred that the clip comprises a first plug part that is mounted on the clip and is adapted to be in engagement with a second plug part. The first plug part and the second plug part are thereby particularly preferably adapted to transmit signals of a sensor that is different from the magnetic field sensor.

It is preferred that the clip exceeds in the circumferential direction of the wheel axle and angle larger than 180°. The angle is particularly preferably larger than 190°.

BRIEF DESCRIPTION OF THE DRAWINGS

In the following, the invention is explained on the basis of the attached schematic drawings.

DETAILED DESCRIPTION OF ILLUSTRATIVE EMBODIMENTS

Figure 2:
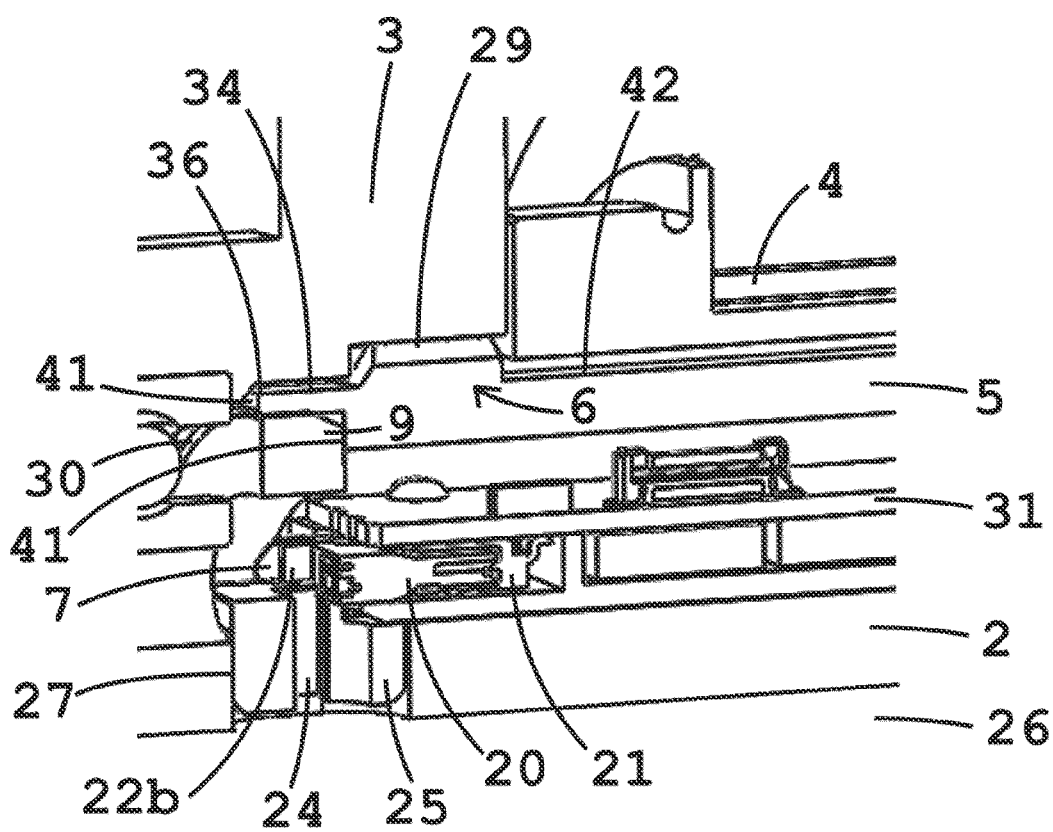
FIG. 2 shows a longitudinal section through the wheel hub.
Figure 3:
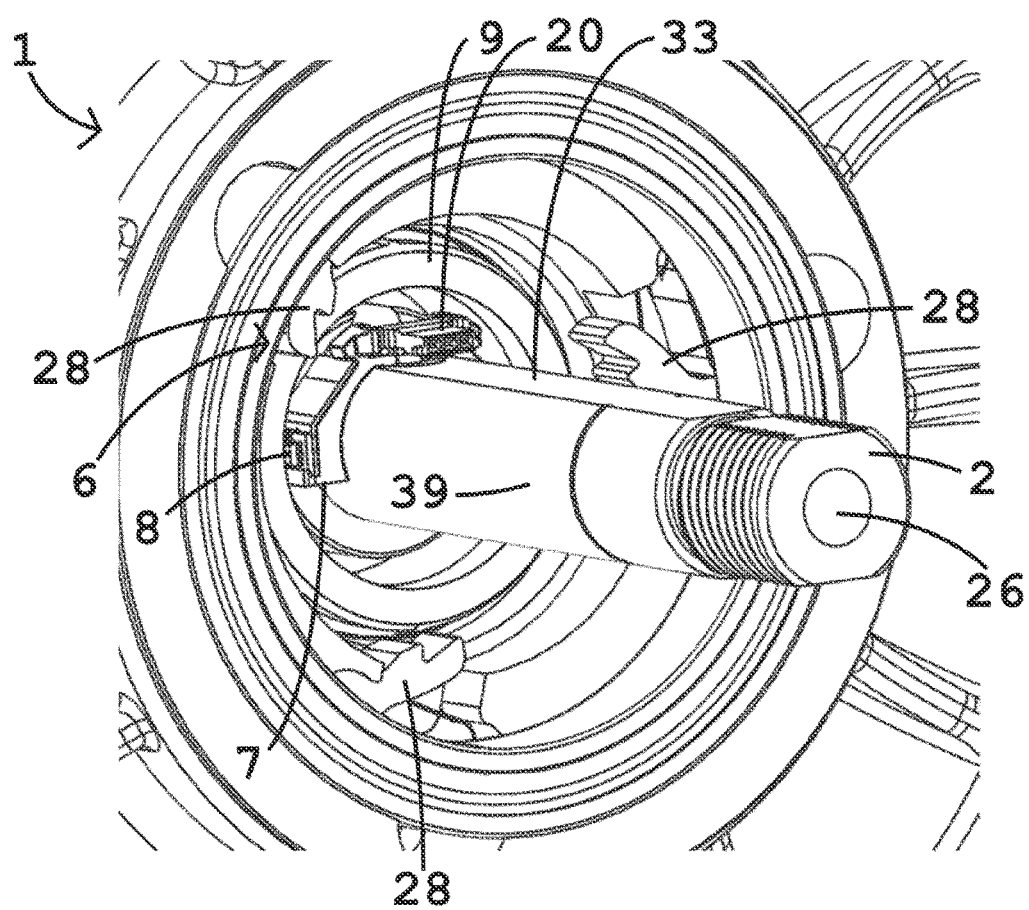
FIG. 3 shows a perspective view of the wheel hub, wherein the wheel hub is open.
Figure 4:
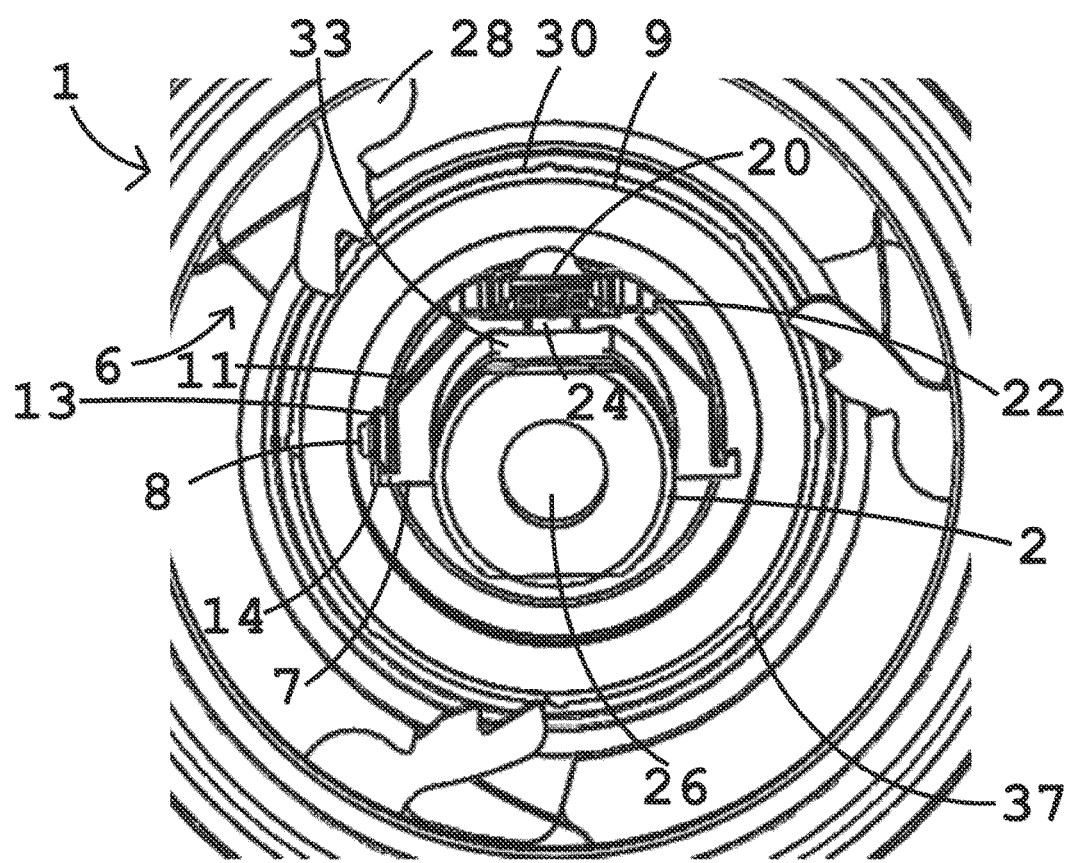
FIG. 4 shows a cross section through the wheel hub.

As it can be seen from FIGS. 2 to 4, a wheel hub 1 for a drive wheel of a vehicle comprises a wheel axle 2, a clip 7, a magnetic field sensor 8 and a pole ring 9. The clip 7 encompasses an outer surface of the wheel axle 2 in C-shaped manner and is mounted torsionally rigid against the wheel axle 2. In order to form the clip 7 particularly torsionally rigid, the clip 7 can exceed in circumferential direction of the wheel axle 2 and angle larger than 180°, in particularly larger than 190°, as it can be seen in particular in FIG. 4. The pole ring 9 is arranged concentrically around the wheel axle 2 and in a distance to the magnetic field sensor 8. In addition, the pole ring 9 is supported such that it can rotate relative to the wheel axle 2. The pole ring 9 comprises alternately in its circumferential direction magnetic north poles and magnetic south poles, wherein, in principle, only a single one of the north poles and a single one of the south poles is conceivable. The magnetic field sensor 8 is mounted on the clip 7 and adapted to detect a magnetic field that originates from the pole ring 9, so that a movement of the pole ring 9 relative to the wheel axle 2 can be deduced. By means of the clip 7, it is advantageously possible to define the distance of the magnetic field sensor 8 to the pole ring 9 with a high precision. The distance of the magnetic field sensor 8 to the pole ring 9 according to FIGS. 2 to 4 is a radial distance, wherein the magnetic field sensor 8 and the pole ring 9 are arranged in the same axial position. Therefore, no axial distance is provided according to FIGS. 2 to 4. Alternatively, it is conceivable that the distance of the magnetic field sensor 8 to the pole ring 9 is an axial distance and that the magnetic field sensor 8 and the pole ring 9 are arranged in the same radial position. In addition, it is conceivable that a radial distance as well as an axial distance are provided. If the radial distance and no axial distance are provided, a surface of the magnetic field sensor 8, wherein the surface is facing toward the pole ring 9, can be arranged perpendicular to a radial direction of the wheel hub 1, as it is for example shown in FIG. 4.

Figure 1:
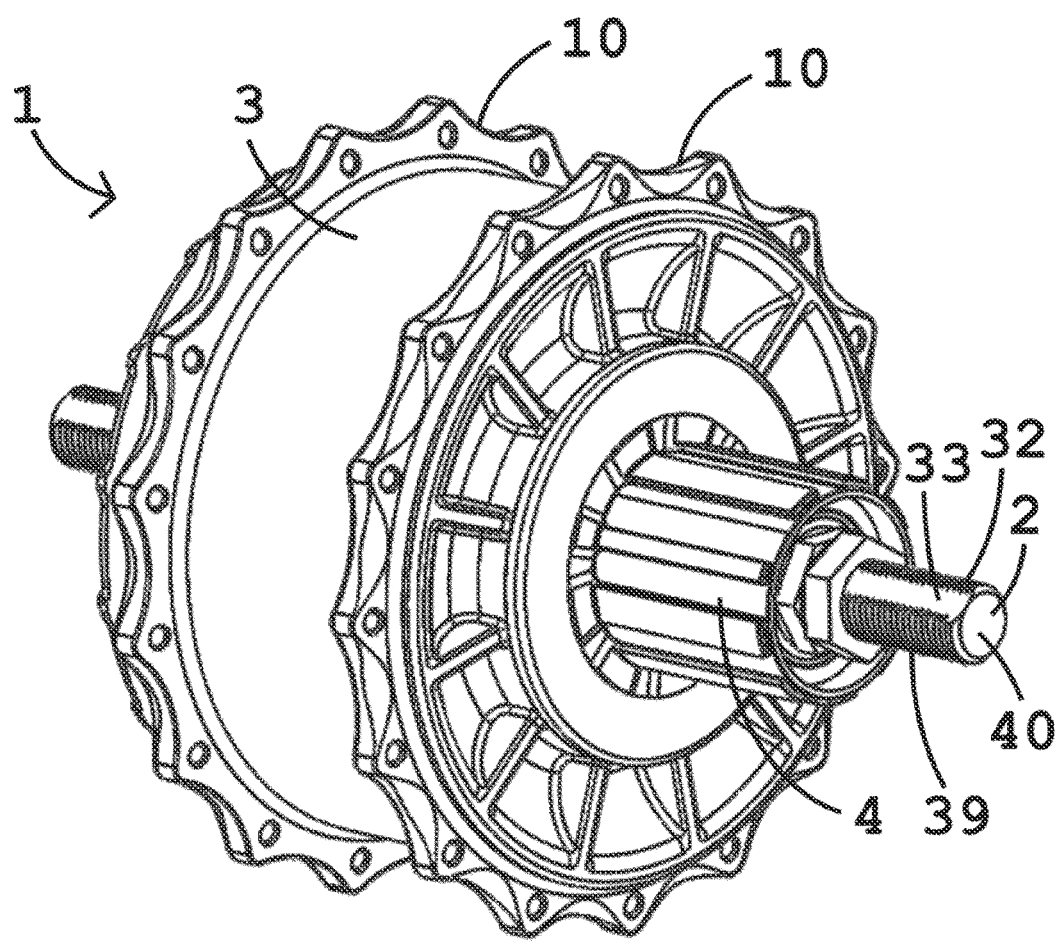
FIG. 1 shows a perspective view of a wheel hub, wherein the wheel hub is assembled.

As it can be seen from FIG. 1, the wheel hub 1 comprises a hub casing 3. The wheel hub 1 comprises a motor that is arranged inside of the hub casing 3 and is adapted to drive the drive wheel. The wheel axle 2 can be formed in one piece. Alternatively, the wheel axle 2 can be formed in two pieces with two partial wheel axles that have an axial distance to each other. The space between the two partial wheel axles can be used by the motor. The motor can be an electric motor. The hub casing 3 can comprise outside of the hub casing 3 two spoke flanges with holes that are provided for hanging in spokes of the drive wheel. The wheel axle 2 is provided to be fixedly attached on an auxiliary driven vehicle that comprises the drive wheel. For example, the wheel axle 2 can be fixedly attached on a frame of an electric bicycle. For this purpose, a respective thread 32 can be provided on both longitudinal ends of the wheel axle 2, as it is shown in FIG. 1. The pole ring 9 can be arranged torsionally rigid against the hub casing 3. Therefore, a relative movement between the pole ring 9 and the wheel axle 2 will always be measurable when the drive wheel rotates relatively to the wheel axle 2. Alternatively, it is conceivable that the pole ring 9 is arranged torsionally rigid against a pinion carrier 4 of the wheel hub 1, wherein at least one pinion can be mounted torsionally rigid on the pinion carrier 4 for driving the drive wheel. Therefore, a relative movement between the pole ring 9 and the wheel axle 2 will always be measurable when the pinion carrier 4 rotates relatively to the wheel axle 2.

Figure 7:
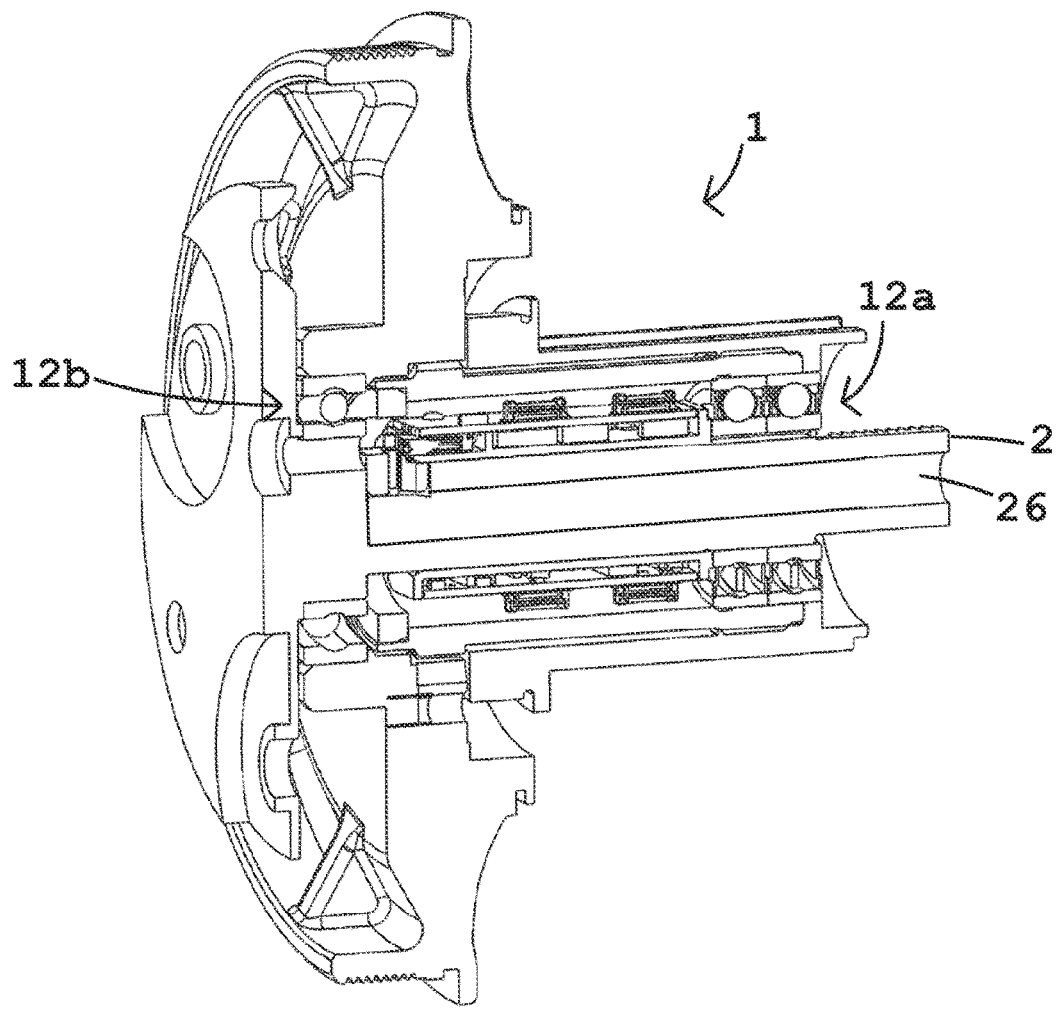
FIG. 7 is similar to FIG. 2, but shows a larger section of the wheel hub.

As it can be seen from FIG. 2, the wheel hub 1 comprises the pinion carrier 4, a transmission sleeve 5, the hub casing 3 and a freewheel 6. At least one pinion can be mounted on the pinion carrier 4 torsionally rigid for driving the drive wheel. The transmission sleeve 5 is coupled torsionally rigid with the pinion carrier 4 and is supported concentrically around the wheel axle 2 and such that it can rotate relatively to the wheel axle 2. Alternatively to the pinion carrier 4, also a belt pulley can be provided that it is adapted to be driven by a belt, in particularly by a toothed belt, and that is coupled torsionally rigid with the transmission sleeve 5. The pole ring 9 is mounted torsionally rigid on the transmission sleeve 5. The transmission sleeve 5 is coupled with the hub casing 3 via the freewheel 6. The transmission sleeve 5 has a first longitudinal end 35 and a second longitudinal end 36, wherein the first longitudinal end 35 is the axial outer longitudinal end of the transmission sleeve 5. As it is illustrated in FIG. 7, the transmission sleeve 5 can be coupled torsionally rigid with the pinion carrier 4 in the region of the first longitudinal end 35, and the freewheel 6 can be arranged in the region of the second longitudinal end 36. In addition, it is conceivable that in the region of the first longitudinal end 36 a first bearing 12a is provided that is arranged in radial direction between the wheel axle 2 and the transmission sleeve 5 and supports the transmission sleeve 5 such that it can rotate relatively to the wheel axle 2. In addition, it is conceivable that a second bearing 12b is provided that is arranged in an axial position that is free from the transmission sleeve 5 and in a radial direction between the wheel axle 2 and the hub casing 3 and supports the hub casing 3 such that it can rotate relatively to the wheel axle 2. FIGS. 3 and 4 show that the freewheel 6 is formed by a plurality of locking pawls 28 that are mounted on the hub casing 3 and a locking wheel 29 that is formed by the transmission sleeve 5. The locking wheel 29 can comprise a multitude of protrusions 14 that are arranged on the outer surface of the transmission sleeve 5 and engage in the locking pawls 28 during rotation of the freewheel 6 in its locking direction.

The transmission sleeve 5 can comprise on its front surface 41 in the region of the second longitudinal end 36 a ring shaped transmission sleeve protrusion 34 that protrudes in axial direction from the transmission sleeve 5 for mounting the pole ring 9 on the transmission sleeve 5. The pole ring 9 can be arranged inside of the transmission sleeve protrusion 34 and be supported by the transmission sleeve protrusion 34. In addition, the pole ring 9 can contact the front surface of the transmission sleeve 5 as it is illustrated in FIG. 2. Therefore, a definition of the position of the pole ring 9 in axial direction is obtained. In addition, it is conceivable that between the pole ring 9 and the transmission sleeve protrusion 34 a clamping ring 30 is arranged, wherein the clamping ring 30 contacts radially outside the transmission sleeve protrusion 34 and radially inside the pole ring 9. The clamping ring 30 can comprise clamping ring protrusions that are arranged in a distance in circumferential direction as it is illustrated in FIGS. 3 and 4, wherein the clamping ring protrusions 37 engage in corresponding transmission sleeve recesses that are arranged in the transmission sleeve protrusion 34. The clamping ring 30 can for example comprise a plastic material, steel or spring steel or consist out of the plastic material, steel, steel or spring steel.

Figure 6:
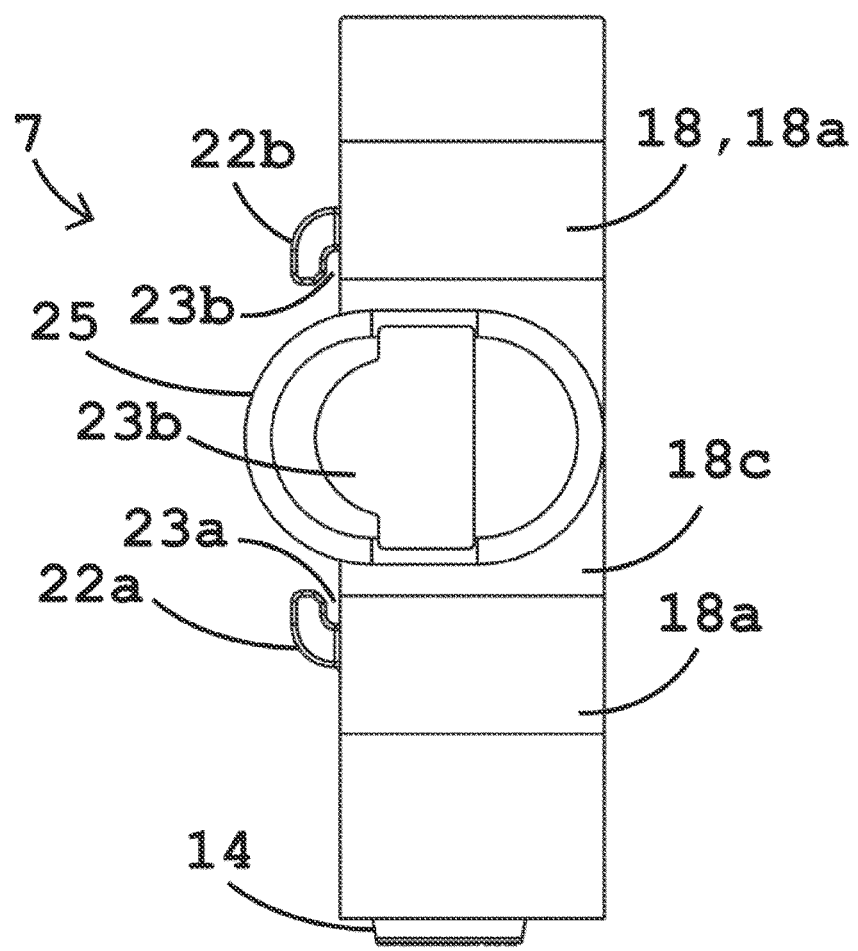
FIG. 6 shows a top view on the clip.

As it can be seen from FIGS. 2 to 4, the wheel axle 2 is formed at least partially as a hollow shaft and therefore comprises a cavity 26. The cavity 26 can extend along the complete length of the wheel axle 2 as it shown in FIG. 4. FIG. 4 shows additionally that the wheel axle 2 comprises a wheel axle through hole 27 that extends through the wheel axle 2 from the outer surface 39 of the wheel axle 2 to the cavity 26. The clip 7 comprises a clip through hole 24 and a region that confines the clip through hole 24, wherein the region engages form-fittedly in the wheel axle through hole 27. The region that confines the clip through hole 24 can be formed by a ring 25. The ring 25 can be circular shaped and can also have a shape that differs from the circular shape, as it is illustrated in FIG. 6. An electric wiring of the magnetic field sensor 8 can be guided through the clip through hole 24 and through the wheel axle through hole 27 in the cavity 26. The electric wiring of the magnetic field sensor 8 can be guided out of the wheel axle 2 on another position of the wheel axle 2. The other position can for example be a front surface 40 of the wheel axle 2 and/or the wheel axle 2 can have a wheel axle recess that extends through the wheel axle 2 from the outer surface of the wheel axle 2 to the cavity 26.

FIG. 2 shows that the wheel hub 1 can comprise a torque measuring device. For this purpose, the transmission sleeve 5 comprises a magnetically coded material which magnetic properties change under the influence of a torque that is acting on the transmission sleeve 5, wherein the magnetic properties change due to magnetostriction. For measuring of the torque, the torque measuring device comprises a torque measuring circuit board 31 and a sensor (not shown) that is arranged on the torque measuring circuit board 31 and is adapted to detect the changing magnetic properties. The torque that is acting on the transmission sleeve 5 can be deduced out of the changing magnetic properties that are detected by the sensor. This can for example be carried out by using a calibration measurement during which the transmission sleeve 5 is applied with several different torques and the measurement signal detected by the sensor is recorded. The sensor can comprise a coil or a multitude of coils.

FIG. 2 shows additionally that the wheel hub 1 can comprise a first plug part 20 that is mounted on the clip 7 and the torque measuring device can comprise a second plug part 21 that is mounted on the torque measuring circuit board 31 and is in engagement with first plug part 20. An electric wiring of the torque measuring device is guided via the first plug part 20 and via the second plug part 21. In addition, the electric wiring of the torque measuring device can be guided through the clip through hole 24 and through the wheel axle through hole 27. In this case the electric wiring of the magnetic field sensor 8 and the electric wiring of the torque measuring device can be combined to a single wiring harness. The first plug part 20 and the second plug part 21 can be a Molex-connector.

Figure 5:
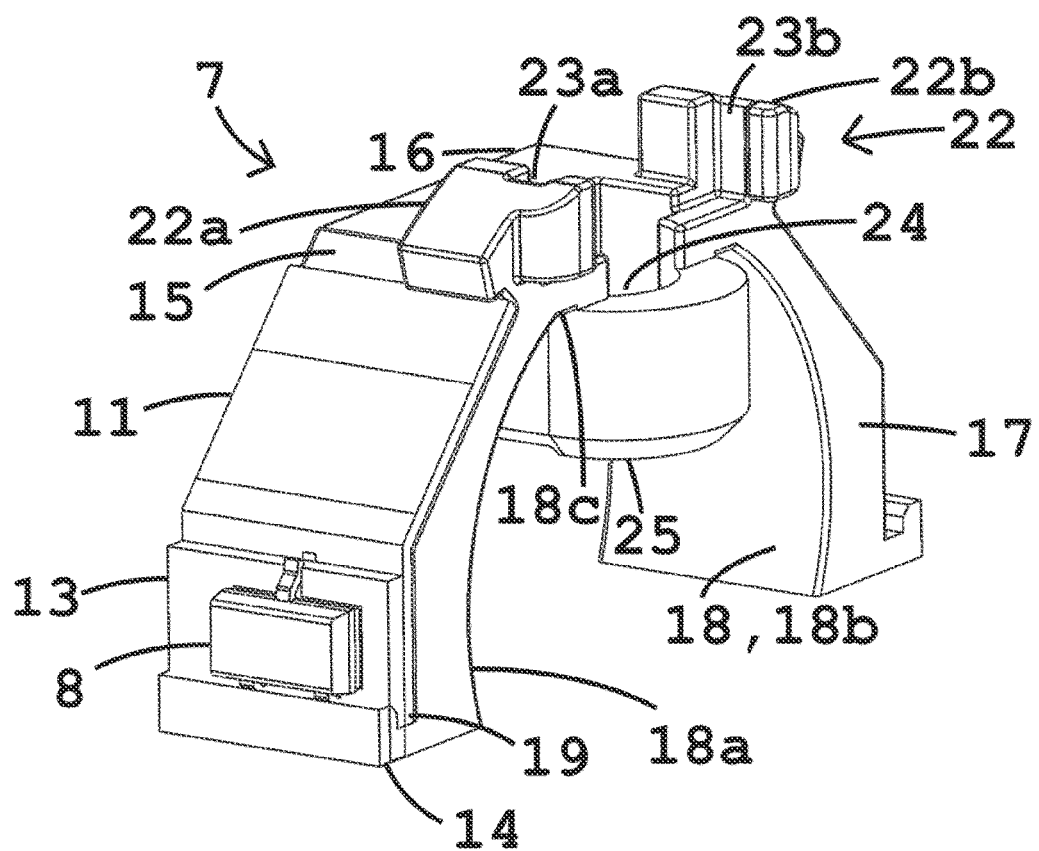
FIG. 5 shows a perspective view of a clip.

As it can be seen from FIG. 5, the clip 7 can comprise a plug part holder 22 that is adapted to hold the first plug part 20. The plug part holder 22 therefore comprises a first plug part holder part 22a with a first recess 23a and a second plug part holder part 22b with a second recess 23b. The clip through hole 24 is arranged in circumferential direction between the first plug part holder part 22a and the second plug part holder part 22b. The first recess 23a and the second recess 23b are arranged facing towards each other and are adapted to engage with corresponding protrusions of the first plug part 22. FIG. 5 shows additionally that the clip 7 comprises a first front surface 16 and a second front surface 17, wherein the second front surface 17 is facing away from the first front surface 16 and is arranged facing towards the torque measuring device. The first plug part 20 protrudes over the first front surface 17.

As it can be seen from FIGS. 3 and 4, the wheel axle 2 can comprise a flattened region 33 on the outer surface of the wheel axle 2. An inner surface 18 of the clip 7 comprises two circular arc-shaped sections 18a, 18b and a straight section 18c that is arranged between the two circular arc-shaped sections 18a, 18b, wherein the two circular arc-shaped sections 18a, 18b and the straight section 18c are arranged in circumferential direction of the wheel axle 2 next to each other. The straight section 18c is in the circumferential direction as long as the flattened region 33 and contacts the flattened region 33 along its complete length in the circumferential direction. The circular arc-shaped sections 18a, 18b contact the regions of the wheel axle 2 which are arranged adjacent to the flattened region 33, wherein the adjacent regions are also circular arc-shaped. FIGS. 3 and 4 show that the wheel axle through hole 27 can extend through the flattened region 33 of the wheel axle 2 and that the clip through hole 24 can extend through the straight section 18c of the inner surface 18.

FIGS. 3 to 5 show that the magnetic field sensor 8 can be arranged on an outer surface 15 of the clip 7. The clip 7 therefore comprises an L-shaped protrusion 14 with two arms, wherein the protrusion 14 protrudes from the outer surface 15 of the clip 7, so that a recess 19 is formed between one of the two arms and the outer surface 15 of the clip 7. The wheel hub 1 comprises a magnetic field sensor circuit board 13 on which the magnetic field sensor 8 is arranged and that is arranged in the recess 19. The magnetic field sensor circuit board 13 is clamped between one of the two arms and the outer surface 15 of the clip 7, so that the magnetic field sensor circuit board 13 cannot get out of the recess 19 during an operation of the wheel hub 1 and abuts on the other of the two arms. The wheel hub 1 additionally comprises a conductor path 11 that is adapted to provide the magnetic field sensor 8 with an electric current. The conductor path 11 is clamped between the magnetic field sensor circuit board 13 and the outer surface 15 of the clip 7.

The wheel hub 1 furthermore comprises an electric circuit that is adapted to process a measurement signal of the magnetic field sensor 8 and that is arranged on the conductor path 11. The measurement signal can for example comprise impulses. The wheel hub 1 comprises an electronic casing 12 that is also arranged on the conductor path 11 and that houses the electrical circuit. The electrical circuit can be arranged in circumferential direction of the wheel axle 2 between the magnetic field sensor 8 and the clip through hole 24.

As it can be seen from FIG. 4, a first section of the clip 7 on which the magnetic field sensor 8 is arranged is thicker than a second section of the clip 7 on which the electrical circuit is arranged. It is therefore achieved that the magnetic field sensor 8 is arranged close to the pole ring 9 and that simultaneously the electrical circuit is provided a large space between the clip 7 and the pole ring 9.

The clip 7 can be made out of an elastic material, in particular an elastic plastic material. The elastic plastic material can be polyamide.

Although the invention has been illustrated and described in detail by means of the preferred embodiment examples, the present invention is not restricted by the disclosed examples and other variations may be derived by the skilled person without exceeding the scope of protection of the invention.

The invention claimed is:

1. A wheel hub for a drive wheel of a vehicle, the wheel hub comprising:
   a wheel axle;
   a clip encompassing an outer surface of the wheel axle in a C-shaped manner and mounted torsionally rigidly against the wheel axle;
   a magnetic field sensor mounted on the clip; and
   a pole ring arranged concentrically around the wheel axle in a distance to the magnetic field sensor and supported such that the pole ring is rotatable relative to the wheel axle,
   wherein the magnetic field sensor is configured to detect a magnetic field originating from the pole ring so that a movement of the pole ring relative to the wheel axle is deducible.

2. The wheel hub according to claim 1, further comprising:
   a pinion carrier on which at least one pinion is torsionally rigidly mountable or a belt pulley configured to drive the drive wheel;
   a transmission sleeve coupled torsionally rigidly with the belt pulley or the pinion carrier and supported concentrically around the wheel axle such that it is rotatable relative to the wheel axle;
   a hub casing; and
   a freewheel via which the transmission sleeve is coupled with the hub casing,
   wherein the pole ring is mounted torsionally rigidly on the transmission sleeve.

3. The wheel hub according to claim 1,
   wherein the wheel axle is made, at least in parts, as a hollow shaft and therefore comprises a cavity and a wheel axle through hole that extends through the wheel axle from the outer surface of the wheel axle to the cavity,
   wherein the clip comprises a clip through hole and a region that confines the clip through hole, and
   wherein the region engages form-fittedly in the wheel axle through hole.

4. The wheel hub according to claim 3, wherein an electric wiring of the magnetic field sensor is guided through the clip through hole and through the wheel axle through hole in the cavity.

5. The wheel hub according to claim 1,
wherein the wheel axle comprises a flattened region on the outer surface of the wheel axle,
wherein an inner surface of the clip comprises two circular arc-shaped sections, and between the two circular arc-shaped sections, a straight section,
wherein the two circular arc-shaped sections and the straight section are arranged next to each other in a circumferential direction of the wheel axle,
wherein the straight section contacts the flattened region and the circular arc-shaped sections contact the regions of the wheel axle which are arranged adjacent to the flattened region.

6. The wheel hub according to claim 1, wherein the magnetic field sensor is arranged on an outer surface of the clip.

7. The wheel hub according to claim 6,
wherein the clip comprises an L-shaped protrusion with two arms,
wherein the protrusion protrudes from the outer surface of the clip and the wheel hub comprises a magnetic field sensor circuit board, on which the magnetic field sensor is arranged, and
wherein the magnetic field sensor circuit board is clamped between one of the two arms and the outer surface of the clip.

8. The wheel hub according to claim 1, wherein the clip is made out of an elastic material.

9. The wheel hub according to claim 8, wherein the elastic material is an elastic plastic material.

10. The wheel hub according to claim 1, further comprising a torque measuring device.

11. The wheel hub according to claim 10, further comprising a first plug part mounted on the clip, wherein the torque measuring device comprises a torque measuring circuit board with a second plug part mounted on the torque measuring circuit board, and wherein the second plug part is in engagement with the first plug part.

12. The wheel hub according to claim 11, wherein an electric wiring of the torque measuring device is guided via the first plug part and via the second plug part.

13. The wheel hub according to claim 12, further comprising:
a pinion carrier on which at least one pinion is torsionally rigidly mountable or a belt pulley configured to drive the drive wheel;
a transmission sleeve coupled with the pinion carrier or the belt pulley torsionally rigidly and supported concentrically around the wheel axle such that it is rotatable relative to the wheel axle;
a hub casing; and
a freewheel via which the transmission sleeve is coupled with the hub casing,
wherein the transmission sleeve comprises a magnetically coded material which magnetic properties change under an influence of a torque acting on the transmission sleeve, and
wherein the torque measuring device comprises a sensor arranged on the torque measuring circuit board and configured to detect the changing magnetic properties.

14. The wheel hub according to claim 1, further comprising a motor configured to drive the drive wheel.

15. An auxiliary driven vehicle comprising:
the wheel hub according to claim 14,
the drive wheel; and
a control device configured to:
control the motor according to measurement data measured by the magnetic field sensor, and
control the motor according to measurement data measured by a torque measuring device.

16. The auxiliary driven vehicle according to claim 15, wherein the auxiliary driven vehicle is an electric bicycle with a storage configured to store electric energy and to deliver the electric energy to the motor.

* * * * *